(No Model.)
L. ZISTEL.
PIPE COUPLING.
No. 284,350. Patented Sept. 4, 1883.
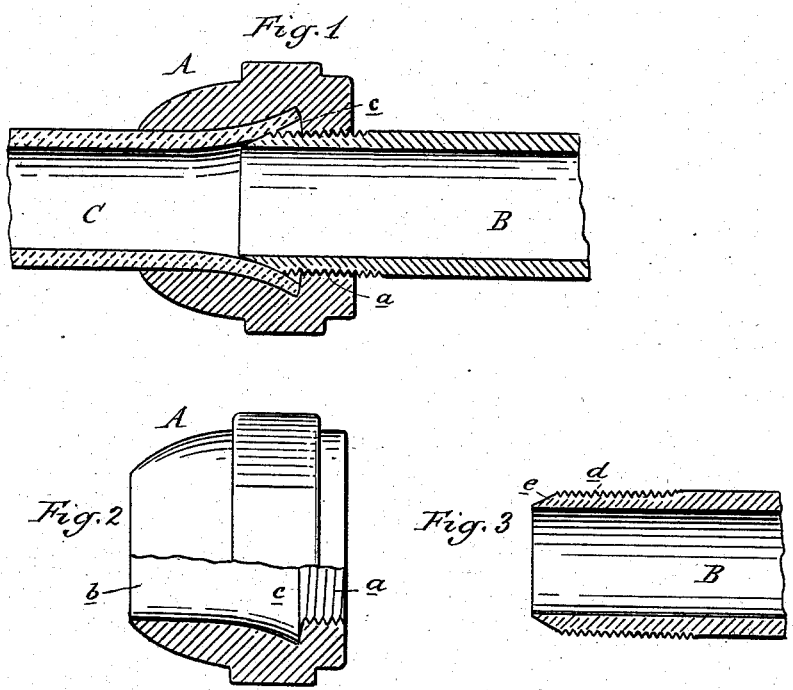
Attest:
A. Barthel
E. Scully.
Inventor:
Louis Zistel
by his Atty. Thos. S. Sprague

UNITED STATES PATENT OFFICE.

LOUIS ZISTEL, OF SANDUSKY, OHIO.

PIPE-COUPLING.

SPECIFICATION forming part of Letters Patent No. 284,350, dated September 4, 1883.

Application filed February 23, 1883. (No model.)

*To all whom it may concern:*

Be it known that I, LOUIS ZISTEL, of Sandusky, in the county of Erie and State of Ohio, have invented new and useful Improvements in Pipe-Couplings; and I do hereby declare that the following is a full, clear, and exact description thereof, reference being had to the accompanying drawings, which form a part of this specification.

This invention relates to certain new and useful improvements in couplings for coupling iron and lead pipes together.

The invention consists in the peculiar construction of the coupling and its operation, as more fully hereinafter described.

Figure 1 is a longitudinal central section of a perfected joint between the lead and the iron pipe formed by my improved coupling. Fig. 2 is an elevation of the coupling detached and partially in section. Fig. 3 is a section of the inner end of the iron pipe.

In the accompanying drawings, which form a part of this specification, A represents a cast-metal coupling interiorly threaded at one end, as shown at $a$ in Figs. 1 and 2, while the bore at the opposite end is smooth, as shown at $b$. In casting this coupling, or it may be turned out after the coupling is cast, there is formed an annular conical recess, $c$, between the threaded and the smooth bores of the coupling.

B is the iron pipe, with a threaded end, $d$, to engage with the threaded end of the coupling, and this end of the pipe is preferably beveled, as shown at $e$ in Figs. 1 and 3.

C is the lead pipe to be coupled to the iron pipe, as follows: The lead pipe is inserted through the smooth end of the coupling until its inserted end is opposite, or nearly so, the farthest end of the conical recess. The lead pipe is then distended with a tool until it fills the conical recess. Then the iron pipe is screwed to place, the beveled end thereof entering the end of the lead pipe until a tight joint is obtained.

It will be seen that with the coupling formed with an enlarged conical chamber an ordinary iron pipe can be used, the recess allowing of the lead pipe being flared, which will permit the iron pipe to enter the end of the lead pipe and secure it in place, while without this recess an ordinary pipe would tend to push the lead pipe out of the coupling, unless the iron pipe was reduced, in which case the passage would be obstructed, while in my invention there is a perfectly clear passage of uniform bore.

I am aware of English Patent No. 11,728 of 1847, and make no claim to the construction shown therein.

What I claim as my invention is—

1. As a new article of manufacture, a pipe-coupling for the purposes described, provided with a smooth bore at one end, a threaded bore at the opposite end, both of substantially the same diameter, and a conical chamber in the body of said coupling, larger than the greatest diameter of the thread, with the base of said conical chamber at the threaded end thereof, substantially as described.

2. The combination of the coupling A, provided with a smooth bore at one end, a threaded bore at the other, and a conical chamber between the two, larger than the greatest diameter of the thread, with the pipe $c$, having its end expanded the full size of said conical chamber, and the pipe B, having a threaded end and uniform bore, substantially as described.

LOUIS ZISTEL.

Witnesses:
H. S. SPRAGUE,
E. W. ANDREWS.